(12) United States Patent
Gupta

(10) Patent No.: US 11,010,752 B1
(45) Date of Patent: May 18, 2021

(54) CARD-TO-CARD DIRECT PAYMENT WITH GENERATED ONE-TIME PASSWORD COMMUNICATED FROM ONE CARD TO A SECOND CARD

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/841,751

(22) Filed: Apr. 7, 2020

(51) Int. Cl.
  *G06Q 20/34* (2012.01)
  *G06K 19/077* (2006.01)
  *G06Q 20/40* (2012.01)

(52) U.S. Cl.
  CPC ..... *G06Q 20/352* (2013.01); *G06K 19/07709* (2013.01); *G06Q 20/341* (2013.01); *G06Q 20/4012* (2013.01)

(58) Field of Classification Search
  CPC ....................... G06Q 20/352; G06K 19/07709
  USPC ....................................................... 235/492
  See application file for complete search history.

(56) References Cited

U.S. PATENT DOCUMENTS

| 9,864,944 B2 | 1/2018 | Radu et al. | |
| 2006/0123077 A1* | 6/2006 | Munetsugu | H04L 61/00 709/203 |
| 2009/0159673 A1* | 6/2009 | Mullen | A61B 5/02042 235/380 |
| 2015/0170016 A1* | 6/2015 | Avagliano | G06K 19/07707 705/41 |
| 2018/0331414 A1* | 11/2018 | Tunnell | H01Q 21/061 |
| 2019/0286805 A1 | 9/2019 | Law et al. | |

OTHER PUBLICATIONS

"One-Time Password," https://en.wikipedia.org/wiki/One-time_password Wikimedia Foundation, Inc., Mar. 19, 2020.

* cited by examiner

*Primary Examiner* — Allyson N Trail
(74) *Attorney, Agent, or Firm* — Weiss & Arons LLP; Michael A. Springs, Esq.

(57) ABSTRACT

An active smart card ("ASC") including an active near-field communication ("NFC") reader configured to enable an active wireless NFC communication directly with another active NFC-enabled smart card to perform a transaction is provided. The ASC may include a battery configured to power the active NFC reader. The ASC may include a thickness wherein at its thickest point, may not be thicker than. 8 millimeters ("mm"). The width and height of the ASC may not be smaller than 90% of a width of 86 mm and not smaller than 90% of a height of 54 mm. The ASC may include a keypad embedded on the ASC that may include a display and alpha-numerical keys. The keypad may not extend a thickness greater than 0.8 mm. The ASC may further include a microprocessor enabling processing and transmitting card ID data and to communicate with a payment network.

17 Claims, 6 Drawing Sheets

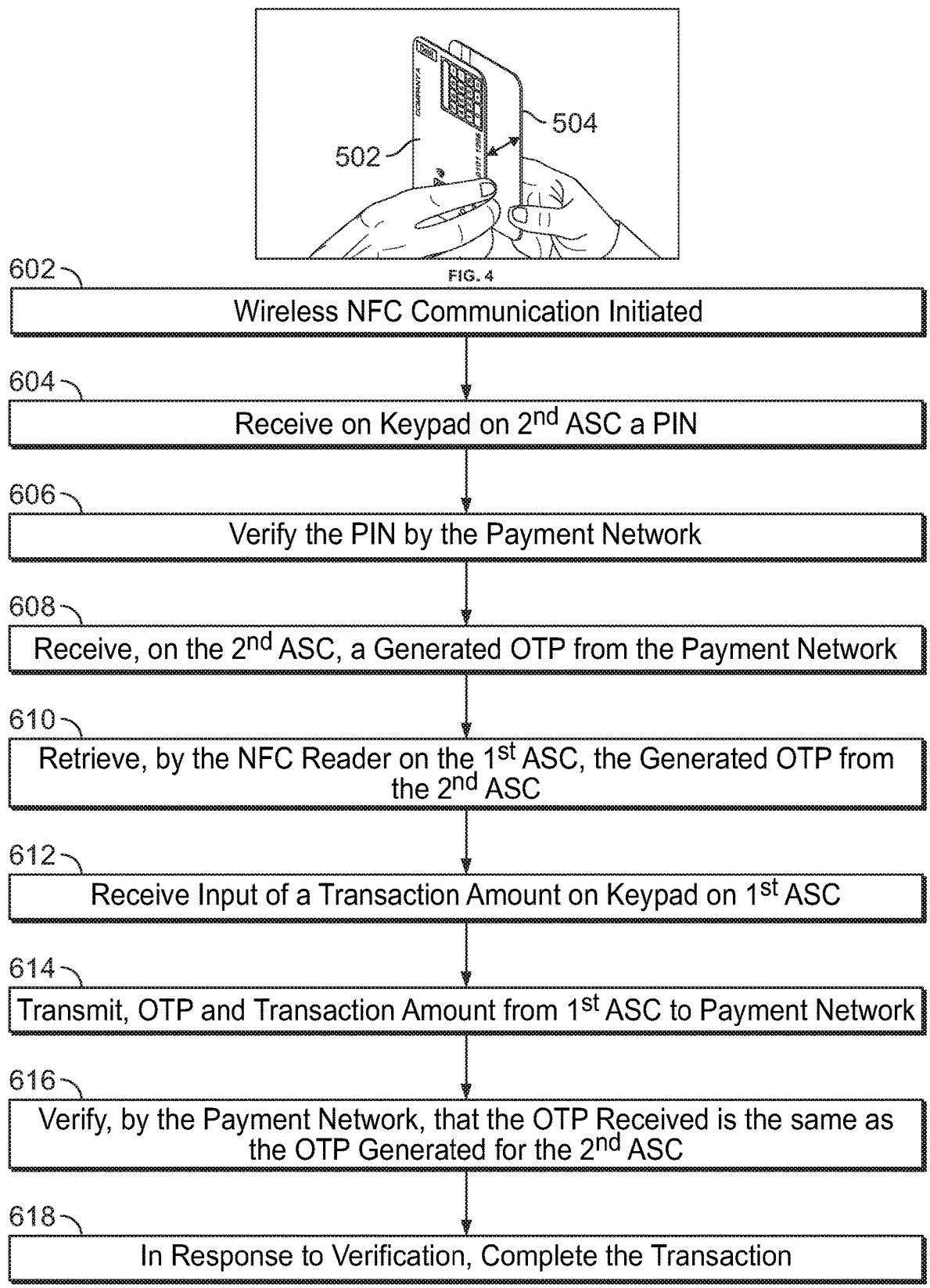

602 — Wireless NFC Communication Initiated

604 — Receive on Keypad on 2nd ASC a PIN

606 — Verify the PIN by the Payment Network

608 — Receive, on the 2nd ASC, a Generated OTP from the Payment Network

610 — Retrieve, by the NFC Reader on the 1st ASC, the Generated OTP from the 2nd ASC 612 — Receive Input of a Transaction Amount on Keypad on 1st ASC 614 — Transmit, OTP and Transaction Amount from 1st ASC to Payment Network 616 — Verify, by the Payment Network, that the OTP Received is the same as the OTP Generated for the 2nd ASC 618 — In Response to Verification, Complete the Transaction

FIG. 6

CARD-TO-CARD DIRECT PAYMENT WITH GENERATED ONE-TIME PASSWORD COMMUNICATED FROM ONE CARD TO A SECOND CARD

FIELD OF TECHNOLOGY

Aspects of the disclosure relate to a smart card with enhanced communication features. Aspects of the disclosure further relate to a one-time-password ("OTP") generated for the smart card.

BACKGROUND OF THE DISCLOSURE

Cards that are used for performing transactions including financial transactions, purchasing products, gift cards, mass transit and personal identification, may include, embedded in the card, multiple methods of performing the transactions. These cards include, but are not limited to, one or more of a magnetic stripe that can be swiped at a card reader device, a Europay, Mastercard and Visa ("EMV") chip to be inserted into a device and a near-field communication ("NFC") chip for a contactless transaction. These cards may be referred to herein in the alternative as purchasing instruments.

NFC is a rapidly growing, short-range and wireless technology. Cards that include an NFC chip are enabled to passively transfer information stored on an NFC tag within the card to an NFC-enabled device, i.e.—smartphone, point-of-sale device. These cards typically do not include a battery. The cards are powered by a signal received from an active NFC-enabled device when the two are in near proximity. The signal provides sufficient power to the card to enable the card to passively transmit the information to the active NFC-enabled device. The active NFC enabled device can then retrieve the passively transferred information.

These cards may be labeled as 'smart' cards. Conventional smart cards rely upon other devices to make a transaction. However, when an individual needs to make a payment to another individual, the POS device or other suitable device is typically required for completing the transaction.

Therefore, it would be desirable to enable one smart card to directly communicate with the second smart card. It would further be desirable to enable the pair of smart cards to communicate with one another and complete the transaction between the two.

Additionally, smart cards are typically 85.60 millimeters ("mm")×53.98 mm×0.8 mm. This limited form factor allows purchasing instruments to fit easily into a user's wallet or pocket yet also presents design challenges. For example, one design challenge involves the difficulty of attempting to include electronic features in a credit-card-size device. For example, to maintain this limited form factor, a purchasing instrument cannot be constructed using a relatively large power supply.

On the other hand, incorporating electronic features into smart cards may provide technology-based solutions that more securely protect sensitive data. Furthermore, incorporating electronic features into purchasing instruments may increase efficient use and functionality of purchasing instruments.

Therefore, it would be further desirable to provide systems and methods for a smart card that improves security of sensitive data associated with the instruments, further secures a transaction between two smart cards, enhances usability of the instrument and maintains a limited form factor of the instrument.

SUMMARY OF THE DISCLOSURE

Aspects of the disclosure relate to a method for performing a card-to-card direct contactless transaction. The transaction may be between a first active smart card ("ASC") and a second ASC. The first ASC may be an initiator of a transaction. The second ASC may be the target of the transaction. The method may include using a generated one-time password ("OTP") to secure the transaction.

Each of the first ASC and second ASC may include an active near-field communication ("NFC") reader. The first ASC and the second ASC may be associated with an originating entity. The originating entity may be the entity that issues the card. The entity may be associated with a financial institution. In some embodiments, the originating entity for the first ASC may be the originating entity for the second ASC.

The method may include initiating and activating a wireless NFC communication to perform the transaction between the first ASC and the second ASC. The initiating may be enabled using the NFC reader.

Each of the first ASC and the second ASC may include a keypad. The first ASC and the second ASC, at its thickest point, may not be thicker than 0.8 millimeters ("mm"). The keypad may include alpha-numeric keys. The alpha-numeric keys may be configured to be depressed. The keypad, at its thickest point, may not be thinner than 0.8 mm. Each of the first ASC and the second ASC may not be equal to a size not smaller than 90% of a width of 86 mm and not smaller than 90% of a height of 54 mm.

The initiating may include positioning the first ASC within a pre-determined distance to the second ASC. Exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

In some embodiments, prior to the activating the first ASC and the second ASC, the active NFC reader may be powered-off on each of the first ASC and the second ASC. When the first and second ASC come within the pre-determined proximity, the battery may automatically be powered-on.

The method may include securing the transaction. The securing of the transaction may be a multi-layered security. The first layer of security may be performed by confirming a cardholder's PIN being associated with the card. The method may include receiving, on a keypad located on the second ASC, input of a personal identification number ("PIN"). The method may further include verifying the PIN by a payment network associated with the originating entity. The PIN may be transmitted to the payment network by a microprocessor of the second ASC.

In response to the verifying, the method may further include securing the transaction by a second layer of security. The second layer of security may include using a generated one-time password ("OTP".) The second layer of security may include receiving at the second ASC, from the payment network, a generated OTP. The method may include retrieving, using the NFC reader associated with the first ASC, the generated OTP from the second ASC. The method may also include receiving input of a transaction amount on the keypad of the first ASC. The method may further include transmitting, using a microprocessor embedded in the first ASC, the generated OTP and the transaction amount to the payment network.

The method may further include a third layer of security to secure the transaction. The method may include verifying and thereby yet further securing, by the payment network, that the generated OTP is equal to the OTP generated for the second ASC. In response to the verifying, the method may include completing the transaction using the first active smart card and the payment network.

The method may further include monitoring and recording the transaction by the payment network. The monitoring and recording of the transaction may enhance the security of the transaction.

When the generated OTP transmitted to the first ASC is not equal to the OTP generated for the second ASC, the method may include terminating the wireless NFC communication between the first and second ASC.

Following the completion of the transaction, the method may further include receiving, using the active NFC reader on the second ASC, a confirmation from the first ASC of the completion of the transaction. In response to the receipt of the confirmation, the method may further include displaying, on a display of the second ASC, a message confirming the completion of the transaction. The displaying may be enabled by a transmittal of the confirmation from the microprocessor to the display via a display connector.

In some embodiments, prior to initiating and activating the wireless NFC communication, the first ASC and the second ASC may be configured to perform a handshake in order to confirm that the first ASC is the initiator of the transaction and the second ASC is the target of the transaction. This may ensure that no attempted hacker is in the middle of the transaction.

The method may include performing a secure handshake between the first ASC and the second ASC by retrieving card ID data associated with the second ASC, using the active NFC reader associated with the first ASC. The method may further include acknowledging and confirming the card ID data using a microprocessor embedded in the first ASC.

The method may further include, using the active NFC reader associated with the second ASC, retrieving card ID data associated with the first ASC and the transaction amount, from the first ASC. The method may further include acknowledging and confirming the card ID data and the transaction amount associated with the first ASC using the microprocessor embedded in the second ASC.

In certain embodiments, the first and second active ASC may include a light embedded in the card. The light may be in the form of a light-emitting diode ("LED"). The light may preferably not alter the size of a standard card size. The light may be powered by the battery included in each of the first and second active ASC. When the wireless communication is initiated, the light may emit a red color indicating that a transaction may be in progress. When the transaction is complete, the light may emit the color green. This may indicate a completion of the transaction.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 6 shows an illustrative flowchart in accordance with principles of the invention.

DETAILED DESCRIPTION OF THE DISCLOSURE

Figure 1:
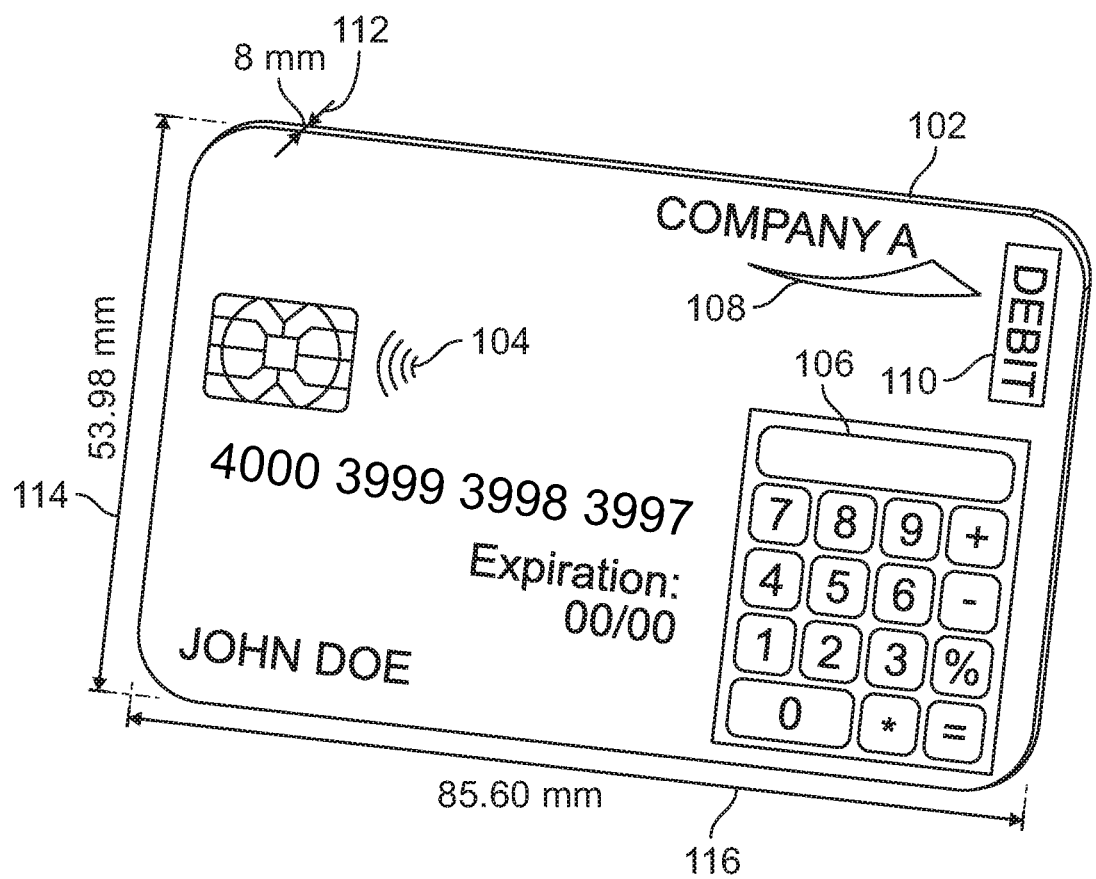
FIG. 1 shows an illustrative exemplary diagram in accordance with principles of the disclosure.

An active smart card ("ASC") may be provided. The ASC may include an NFC reader. The NFC reader may be configured to enable an active wireless NFC communication with another NFC-enabled device.

The ASC may also include a battery. The battery may be configured to power the active NFC reader. The ASC may be associated with an originating entity. The originating entity may be an entity that issues cards. The originating entity may be associated with a financial institution.

The ASC may also include a keypad. The keypad may include a display. The keypad may also include alpha-numeric keys that may be configured to be depressed. It should be appreciated that the ASC that includes the keypad, may include a thickness wherein the ASC, at its thickest point, may not be thicker than 0.8 millimeters ("mm"). The width and height of the ASC may not be smaller than 90% of a width of 86 mm and not smaller than 90% of a height of 54 mm.

It should further be appreciated that the keypad embedded on the ASC does not extend a thickness greater than 0.8 mm.

The ASC may also include a microprocessor. The microprocessor may enable processing, storing and transmitting card ID data. The microprocessor may further be enabled to communicate with a payment network associated with the originating entity. The communication may enable completion of a transaction between the ASC and an additional ASC.

The ASC may also include a nano wireless network interface card ("NIC") card. The NIC may enable establishing a wireless connection to a Wi-Fi device. The Wi-Fi device may enable for the communication of the ASC and the payment network.

The ASC may also include a display connector. The display connector may be configured to intermediate between the keypad, the display and the microprocessor.

It should be appreciated that components of the ASC may be arranged such that a total thickness of the ASC is less than or equal to 0.8 mm. For example, the keypad, the microprocessor, the active NFC reader, the battery, the NIC and the display connector may be arranged such that a total thickness of the ASC is less than or equal to 0.8 mm.

Apparatus for a smart card are provided. The smart card may not be greater than 86 mm×54 mm×0.8 mm.

When the ASC is within a pre-determined distance of an additional ASC, the active NFC may enable the ASC and the additional ASC to perform a transaction. The additional ASC may also include an active NFC reader. The ASC and the additional ASC may be configured to activate the wireless NFC communication and complete a transaction.

The additional ASC may also include a battery configured to power the active NFC reader.

The additional ASC may be associated with an originating entity. In some embodiments, the originating entity of the ASC may be the originating entity of the additional ASC. In certain embodiments, the originating entity of the ASC may be a first originating entity. The originating entity of the additional ASC may be a second originating entity. Each of the first and second originating entity may be associated with a payment network. The payment network may be a consortium for the first and second originating entity.

The additional ASC may include a thickness, wherein the additional ASC, at its thickest point, may not be thicker than 0.8 millimeters ("mm"). The additional ASC may also include a width and height not smaller than 90% of a width of 86 mm and not smaller than 90% of a height of 54 mm.

The additional ASC may also include a keypad embedded on the additional ASC. The keypad may include a display and alpha-numerical keys. Each alpha-numeric key may be configured to be depressed. The additional ASC that includes the keypad may include a thickness wherein the ASC, at its thickest point, may not be thicker than. 8 millimeters ("mm").

The additional ASC may also include a microprocessor enabling processing, storing and transmitting card ID data. The additional ASC may also include a nano wireless network interface card ("NIC") card that may enable establishing a wireless connection to a Wi-Fi device.

The additional ASC may also include a display connector. The display connector may be configured to intermediate between the keypad, the display and the microprocessor.

It should be appreciated that components of the additional ASC may also be arranged such that a total thickness of the ASC is less than or equal to 0.8 mm. For example, the keypad, the microprocessor, the active NFC reader, the battery, the NIC and the display connector may be arranged such that a total thickness of the ASC is less than or equal to 0.8 mm.

When the ASC and an additional ASC may be within the pre-determined proximity, active NFC may enable establishing an active wireless NFC communication. The active wireless NFC communication may be a secure communication. The security may include multiple layers of security. A first layer of security may involve confirming a PIN being associated with the additional ASC. The additional ASC may be configured to receive, on a keypad located on the second ASC, input of a personal identification number ("PIN"). The PIN may be verified by a payment network associated with the originating entity. The PIN may be transmitted to the payment network by a microprocessor of the second ASC in order to be verified.

In response to the verifying, an additional second layer of security may be included. The additional layer of security may include generating of a OTP to further secure the communication between the two ASC cards. The payment network may verify the PIN and a user-name and/or other card ID data stored on the additional ASC prior to generating the OTP. This may enable, at least, a two-factor authentication.

The payment network may be a back-end server for both the ASC and the additional ASC. The payment network may be configured to generate the OTP and transmit it to the additional ASC. The OTP may only be valid for a pre-determined amount of time. The OTP may only be valid for a single transaction. The payment network may be enabled to authenticate and confirm a secure wireless NFC communication between the ASC and the additional ASC when the OTP is generated, transmitted, communicated to the ASC and returned to the payment network all within the pre-determined amount of time.

The additional ASC may be configured to receive, from a payment network, a generated one-time password ("OTP"). The ASC may be configured to retrieve the generated OTP from the additional ASC using the NFC reader on the ASC. The ASC may also be configured to receive input of a transaction amount on the keypad. The ASC may be further configured to transmit, using the microprocessor, the generated OTP and the transaction amount to the payment network.

The payment network may be configured to verify the transaction amount. The payment network may also be configured to verify the OTP. The verifying of the OTP may be a third layer of securing the wireless NFC communication. The verifying may include the payment network confirming that the generated OTP is equal to the OTP generated for the additional ASC.

In some embodiments, the payment network may not be able to confirm that the generated OTP is the same OTP generated for the additional ASC. When the OTP does not match the OTP generated for the additional ASC, the ASC may be configured to terminate the wireless NFC communication between the ASC and the additional ASC.

Since the payment network may be the same payment network for both the ASC and the additional ASC, this enables the payment network to secure the transaction from initiation of the transaction thru the completion of the transaction. The generated OTP may be monitored by the payment network and confirmed prior to the completion of the transaction.

In some embodiments, prior to initiating the wireless NFC communication, the ASC and the additional ASC may be inactive. In order to activate the ASC from an inactive state to an active state, methods may include receiving input of the PIN on a keypad located on the first ASC and verifying, using the microprocessor embedded in the first ASC, the PIN being associated with the ASC. When the PIN is confirmed to be associated with the ASC, the ASC may be configured to be in an active state and may be enabled to initiate the wireless communication.

In order to activate the additional ASC from an inactive state to an active state, methods may include receiving input of the PIN on a keypad located on the additional ASC and verifying, using the microprocessor embedded in the second ASC, the PIN being associated with the additional ASC. When the PIN is confirmed to be associated with the additional ASC, the additional ASC may be configured to be in an active state and may be enabled to initiate the wireless communication.

In other embodiments, when the ASC and the additional ASC are within the pre-determined proximity, each of the ASC and the additional ASC are automatically activated.

Active smart cards, for purposes of the disclosure, may include one or more types of payment instruments. The payment instrument may include, but may not be limited to, a credit card, debit card, ATM card, phone payment card, stored-value card and gift card.

The direct communication between the ASC and an additional ASC may enable a completion of a transaction between the two. The direct communication may be enabled using near-field communication ("NFC") technology. NFC standards cover communications protocols and data exchange formats. NFC standards are based on existing RFID standards including ISO/IEC 14443 and FeliCa. The standards include ISO/IEC 18092 and those defined by the NFC Forum.

NFC may be a standard for wireless data transition and may adhere to certain specifications in order to be able to communicate properly with each other. Similar to other wireless signals like Bluetooth and Wi-Fi, NFC works by sending information over radio waves. The NFC technology may be based on radio-frequency identification ("RFID") that may use electromagnetic induction in order to be able to transmit information. Bluetooth connections may be enabled to transmit data up to about 10 meters from the source. NFC communications may be enabled to exchange data up to about 4 inches from the source. The connectivity of a first and second device may be a faster connection when using NFC.

NFC may operate at 106 Kbps, 212 Kbps and 424 Kbps. NFC may transmit at a speed of 13.56 megahertz ("Mhz"). NFC data is transmitted in an NFC Data Exchange Format (NDEF), using the Simple NDEF Exchange Protocol (SNEP). SNEP uses a Layer 2 logical Link Control Protocol (LLCP). This may be connection-based to provide reliable data delivery.

Since the radio frequency ("RF") signals in a communication using NFC have a limited distance, hacking may be very difficult. A potential hacker may be required to be within a few meters distance to be able to attempt hacking the device.

There may be two classifications of NFC devices. A first classification of NFC devices may be passive NFC devices. A second classification of NFC devices may be active NFC devices. Smart cards in connection with a POS terminal, store products, and interactive signs may all be passive NFC devices. Interactive signs and advertisements may also be passive NFC devices. Passive NFC devices may include an NFC tag that stores data but does not have power. These tags are powered when in contact with an active NFC device.

A point-of-sale ("POS") device may be the active NFC device. POS devices may include POS devices at touch payment terminals, card readers at public transport locations, smartphones, ipads, tablets and any other mobile device.

Passive NFC devices may not be able to process any information that may be sent from other sources. Passive NFC devices may also not be able to connect to other passive NFC devices.

These passive NFC devices may include an NFC tag which may enable an active NFC enabled device, when in close proximity, to extract the data stored on the NFC tag using radio waves. They may not include a power source such as a battery and may only gain power when an active NFC device comes in close range to the tag using electromagnetic induction. This mode may be an NFC read-write mode. The read-write mode may enable the active device to read information from the passive device. The read-write mode may be a one-way communication.

For example, when an individual desires more details of a product located in a store, the individual may position his personal mobile device in close range to the NFC tag. The mobile device may be an active NFC device and when the mobile device is within close range, the NFC tag may be powered by an electromagnetic field produced by the mobile device.

Additionally, when a smart card is within range of a POS device to perform a transaction, the smart card is powered and may release data to the POS device. After receiving the data release, the POS device may complete the transaction.

In certain embodiments aspects of the invention may include embodiments of both a first and second active smart card within an active smart card-to-card direct contactless payment system. The first ASC and the second ASC may be associated with an originating entity. The system may use a generated OTP to secure the transaction. Both the first and second active smart card may be active NFC devices. Each of the first and second active smart card may include an active near field communication ("NFC") reader. The active NFC reader may enable a direct communication between the first active smart card and the second active smart card. When the first active smart card is in proximity to the second active smart card, the two smart cards may be directly enabled to exchange data and perform transactions. The direct communication may be independent of a POS device.

The card-to-card direct payment system may preferably preclude the need for an additional smart mobile device involved in a transaction between the two devices. Accordingly, this eliminates the extra step of swiping the card at the POS terminal. Additionally, by enabling a direct communication from one smart card to another smart card, the chance of potential attacks and threats may be mitigated, at least because of the close proximity that may be necessary in order to copy sensitive data. The smart card may only need to communicate with the second active smart card and the payment network. The smart cards may include a hard-wired security system with multiple layers of encryption and may only have access to the payment network. When communicating with a mobile device and/or any other form of a POS device and/or ATM, the level of security of the smart cards may be reduced since mobile devices and other POS devices may be connected and linked to many other network connections and online applications.

It should be appreciated that a contactless transaction between the first and second active smart card may be performed when the proximity of the two smart cards may be equal to or less than a distance of four inches. This may be within approximately a 10 centimeter ("cm") range.

In certain embodiments, the first active smart card may be an initiator of a transaction. The second active smart card may be a recipient of the transaction. Each of the first and second active smart card may be a payment instrument. Each of the first and second active smart card may include NFC to enable the contactless communication.

The system may enable a contactless transaction between a first ASC and a second ASC. The first ASC may be an initiator of a transaction, the second ASC may be the target of the transaction.

Each of the first ASC and the second ASC may include a battery configured to power the active NFC reader. The system may also include a solar pad configured for charging the battery.

Each of the first and second ASC may also include a thickness of each of the first and second ASC, at its thickest point, that may not be thicker than. 8 millimeters ("mm"). A width and height of the ASC may not be smaller than 90% of a width of 86 mm and not smaller than 90% of a height of 54 mm.

Each of the first ASC and the second ASC may also include an embedded keypad. The keypad may include a display and alpha-numerical keys, wherein each alpha-numerical key may be configured to be depressed and the keypad may not extend a thickness greater than 0.8 mm.

The keypad may be embedded on the smart card and may not entail changing the size of the standard card size. In accordance with the ID-1 of ISO/IEC 7810 standard, smart card size may be defined as 85.60×53.98×0.76 mm (3.370× 2.125×0.030 in).

The keypad may include slightly raised numerical keys and may be responsive to actuation by a touch of a finger. It should be appreciated that the numerical keys may be raised no more than the level of the embossed characters on any smart card. The standard credit card such as a Visa or MasterCard is 0.030" (30 mil) thick in areas of embossment. Most embossed cards are 0.030" or 0.024" thick.

Each of the first ASC and the second ASC may further include a microprocessor enabling processing, storing and transmitting card ID data. The microprocessor may further be enabled to communicate with a payment network associated with the originating entity. Each of the first ASC and second ASC may also include an NIC to enable establishing a wireless connection to a Wi-Fi device. The Wi-Fi device may enable the first ASC and the second ASC to connect to the payment network. Each of the first ASC and the second ASC may also include a display connector configured to intermediate between the keypad, the display and the microprocessor.

Each of the first ASC and the second ASC may be in communication with a payment network. The payment network may be associated with the originating entity of both the first ASC and the second ASC.

When the first ASC is within a pre-determined proximity to the second ASC, the first ASC and the second ASC are configured to activate the wireless NFC communication. The system may include the second ASC configure to receive, on a keypad located on the second ASC, input of a personal identification number ("PIN"). The PIN may be verified by the payment network associated with the originating entity. The PIN may be transmitted to the payment network by the microprocessor of the second ASC.

In response to the verifying, the system may be configured to secure the transaction by receiving, from the payment network, a generated OTP. The securing of the transaction may further include retrieving, using the NFC reader associated with the first ASC, the generated OTP from the second ASC. The securing of the transaction may further include receiving input of a transaction amount on the keypad the first ASC and transmitting, using the microprocessor embedded in the first ASC, the generated OTP and the transaction amount to the payment network.

The payment network may be configured to secure the communication by verifying that the generated OTP is equal to the OTP generated for the second ASC. In response to the verifying, the transaction may be completed using the first ASC and the payment network.

It should be appreciated that in some embodiments, both the first and second ASC may also include an NFC tag. The NFC tag may include an antenna. The NFC tag may be for storing data associated with the ASC and can further store data associated with a transaction. The NFC tag may be a re-writable tag. The NFC tag may also enable each of the first and second active smart card to perform as passive NFC devices when preferred.

When both the first and second active smart card are active NFC devices they may communicate in an active peer-to-peer ("P2P") mode. The active P2P mode may be a two-way communication. The active P2P mode of communication may enable utilizing the first active smart card as a passive NFC device when transferring card ID data and the second active smart card as an active NFC device when retrieving and processing the card ID data. Both the devices may generate the radio waves alternately and share information and card ID data.

This P2P mode of communication may enable two smart cards to communicate and directly complete a transaction without the need of a POS device.

For example an individual may wish to make a payment to a friend. The individual may want to transfer funds from his smart card and debit it to his friend's card. The funds may be a donation. The funds may be a loan. The funds may be a gift. Because both cards are active NFC-enabled devices, the two smart cards may communicate and execute the transaction.

In accordance with principles of the disclosure, the individual may position his smart card within 4 inches of the recipient's smart card. The close range may enable NFC to activate the cards to perform the transaction. The individual may input an amount of funds into the keypad of his card that he desires to debit to the recipient's card. The two smart cards may perform a handshake. The handshake may enable each card to acknowledge and authenticate the other card. Once authenticated, the smart card performing the transaction may communicate with a payment network in order to complete the transaction.

The smart card may operate in a networked environment. The smart card may support establishing network connections to one or more remote computers. Such remote computers may be nodes on a network. The nodes may be personal computers or servers that include many or all of the elements described above relative to the smart card. The network connections may include a local area network ("LAN") and a wide area network ("WAN"), and may also include other networks. When used in a LAN networking environment, the smart card may be connected to the LAN through a network interface or adapter. The communication circuit may include the network interface or adapter.

It will be appreciated that the network connections shown are illustrative and other means of establishing a communications link between devices may be used. The existence of any of various well-known protocols such as TCP/IP, Ethernet, FTP, HTTP and the like is presumed, and the smart card can be operated in a client-server configuration to permit a user to retrieve web pages from a web-based server. Web browsers can be used to display and manipulate data on web pages.

The smart card and network nodes may include various other components, such as a battery, speaker, and antennas (not shown). For example, network nodes may be portable devices such as a laptop, tablet, smartphone or any other suitable device for receiving, storing, transmitting and/or displaying relevant information.

The smart card may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The smart card may utilize computer-executable instructions, such as program modules, being executed by a computer. Generally, program modules include routines, programs, objects, components, data structures, etc. that perform particular tasks or implement particular abstract data types. The smart card may be operational with distributed computing environments where tasks are performed by remote processing devices that are linked through a communications network. In a distributed computing environment, program modules may be located in both local and remote computer storage media including memory storage devices.

Each of the first and second ASC may also include a keypad. The keypad may include a display and numerical keys. The numerical keys may be configured to accept input of a personal identification number and a transaction amount.

It should be appreciated that the keypad may be deactivated when not in use. In certain embodiments, the keypad may be activated by a touch of any key on the keypad. The keypad may be responsive to actuation by a stylus. In other embodiments, to protect the smart card from being accessed by an outsider and/or from being pressed on unintentionally, the keypad may require input of one or more pre-determined numerical keys in order to activate the keypad.

Additionally, the active NFC reader may also be powered-off. In order to perform a transaction with the first active smart card and a second active smart card, a PIN may be required to be inputted in the first active smart card in order to activate the active NFC reader.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an active smart card ("ASC"). The ASC 102 may include many components. The ASC, including each of the components, may not exceed the size of a credit card. ASC 102 shows illustrative dimensions that may be associated with the ASC. FIG. 1 shows that illustrative ASC may have a thickness of 0.8 mm, as shown at 112. FIG. 1 shows that the ASC may have a height of 53.98 mm, as shown at 114, and a width of 85.60 mm, as shown at 116.

ASC 102 may include embossed characters. The embossed characters may include an account number, expiration date and a name of a cardholder.

ASC 102 may be a contactless ASC. The contactless element of the ASC may be enabled by the NFC included in the ASC. The NFC symbol, shown at 104, may indicate that this ASC may be used in a contactless transaction. Contactless transactions eliminate the need to swipe and/or insert a card into a POS device or any other card reader. The card can be placed within the pre-determined proximity and the POS device may be enabled to read the necessary data from the card.

The NFC enabled in this exemplary ASC may be an active NFC. Active NFC may enable one ASC to directly communicate and perform transactions with another ASC that includes active NFC. The ASC may be able to perform the transaction independent of any card reader or POS device.

ASC 102 may also include a keypad 106. The keypad 106 may include alpha-numeric keys and a display. ASC 102, in this exemplary diagram may be a debit card, as shown at 110. ASC 102 may be associated with an entity. The entity, as shown at 108, is Company A.

Figure 2:
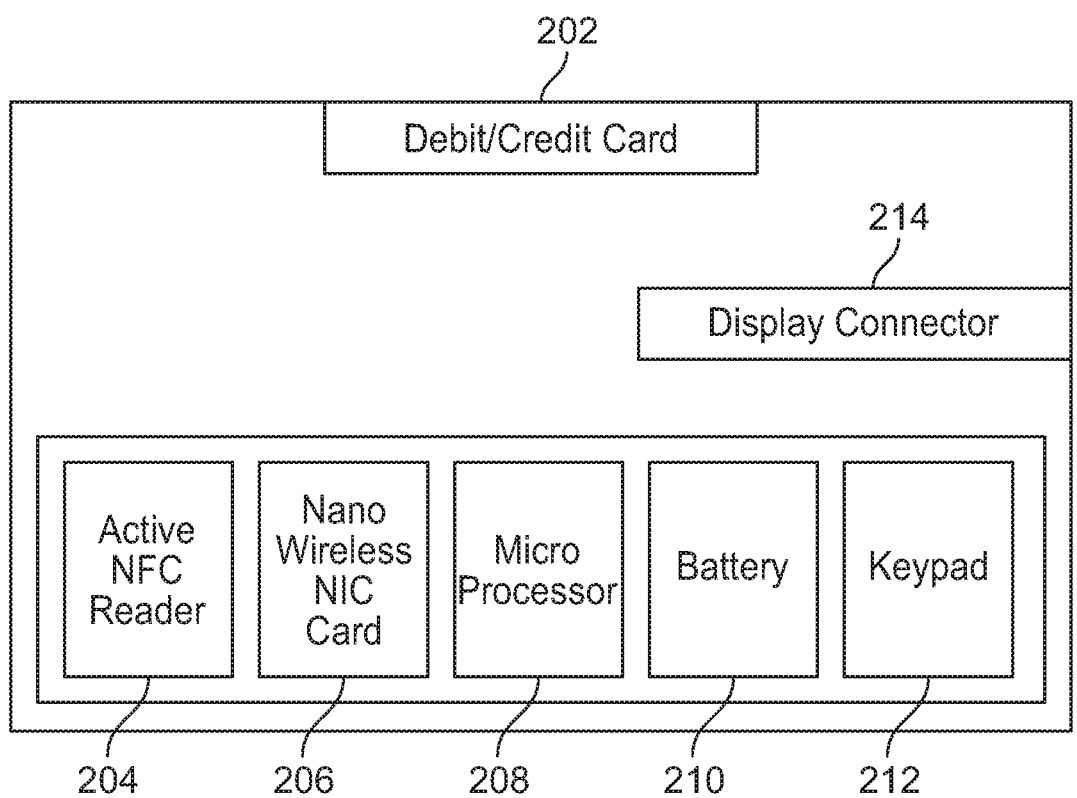
FIG. 2 shows an illustrative architecture in accordance with principles of the disclosure.

FIG. 2 shows an architecture 200 of an ASC 202 that includes an embedded active NFC reader in accordance with principles of the disclosure. ASC 202 may be configured to directly communicate with a second active ASC (not shown.) ASC 202 may include both NFC hardware and software to enable the smart card to perform as an active NFC device.

ASC 202 may include an active NFC reader 204. ASC 202 may also include a nano wireless NIC 206 and a microprocessor 208. ASC 202 may also include a battery 210. ASC 202 may also include a keypad 212. ASC 202 may also include an NFC tag. The NFC tag and additional memory 206 that may be enabled to store data associated with the ASC and the cardholder of the ASC.

ASC 202 may perform a transaction with another ASC. NFC capabilities may enable the cardholder to activate NFC communication on the ASC 202. The active NFC reader 204 may include a display connector 214. The display connector 214 may be enabled to capture the amount of the transaction and the PIN that may be inputted into the keypad 212. Display connector 214 may be connected to the keypad 212 and the microprocessor 208. Display connector 214 may transmit the captured data to the microprocessor 208. The NFC reader may be enabled to be active using power supplied by the battery 210.

The cardholder may then be able to send and receive payment and authentication data to another ASC. The cardholder may authenticate himself as the cardholder by input of a PIN. Upon authentication, the cardholder of the recipient of the transaction may capture the PIN and a transaction amount.

The active NFC reader 204 may be configured to activate NFC communication. The activation of the NFC communication may enable sending and receiving user payment and authentication data from one ASC to another ASC.

Figure 3:
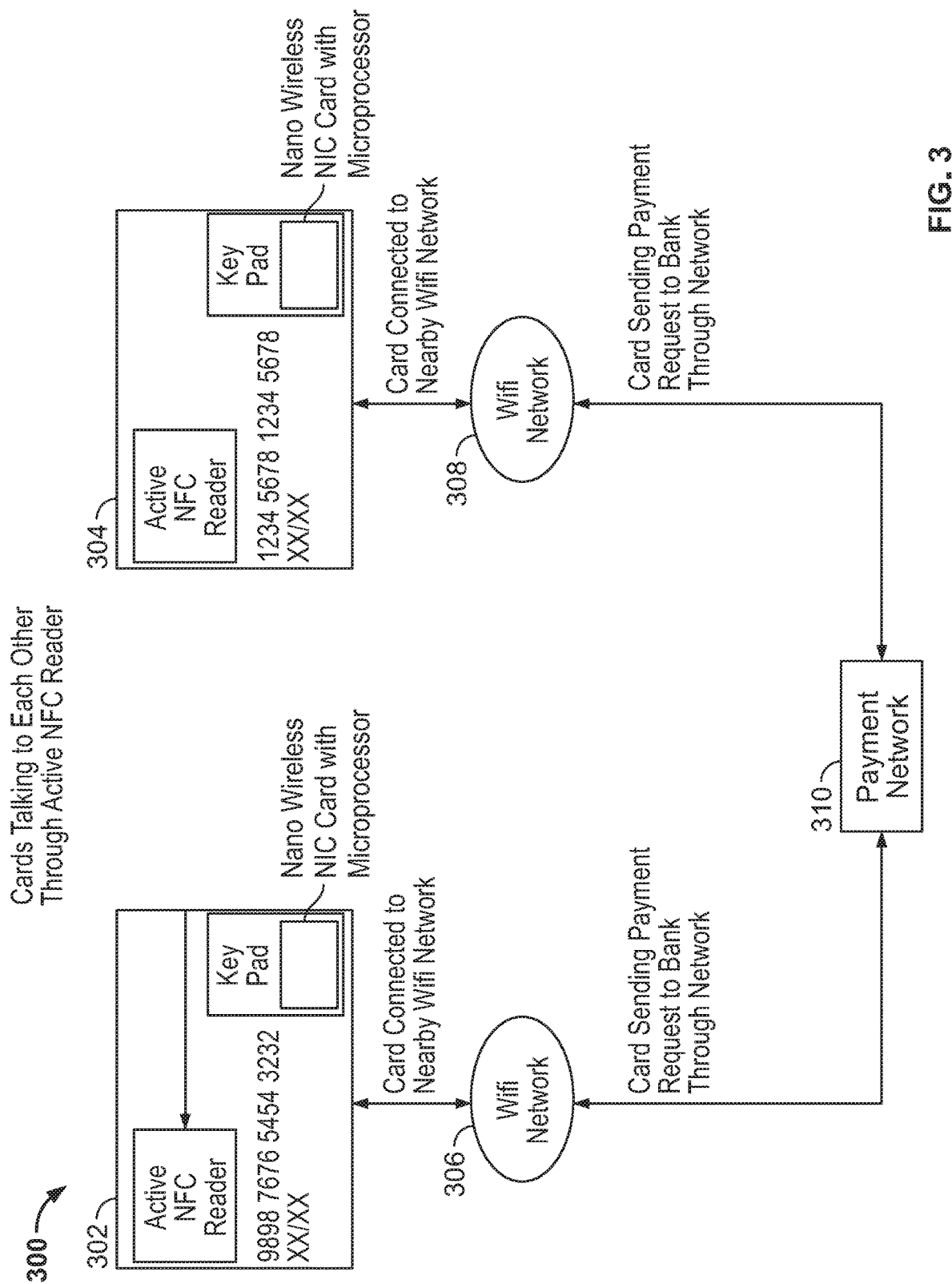
FIG. 3 shows an exemplary diagram in accordance with principles of the disclosure.

FIG. 3 shows an illustrative diagram 300 of one ASC directly communicating with another ASC in order to complete a transaction. In one exemplary embodiment, ASC 302 may be the initiator and ASC 304 may be the target. In another exemplary embodiment, ASC 304 may be the initiator and ASC 302 may be the target.

ASC 302 may be a smart card that includes an active NFC reader. ASC 302 may also include a keypad. ASC 302, in this example, may be enabled to communicate with a second ASC 304 in order to perform a transaction. ASC 304 may also include an active NFC reader and a keypad.

Each of ASC 302 and 304 may include a nano wireless NIC. The ASC may also include a microprocessor.

ASC 302 and 304 may require input of a PIN into the keypad in order to activate the card to communicate with the other card and perform a transaction. When activated, the cards may be enabled to communicate with each other using the active NFC reader embedded in the card. Card ID data including user information, a transaction amount and in some embodiments, a PIN number, may be exchanged between ASC 302 and 304 using the active NFC reader.

Additionally ASC 302 and ASC 304 may be associated with the same financial institution. ASC 302 and 304 may be associated with different financial institutions. In both examples, ASC 302 and 304 may be connected to the same payment network 310. ASC 302 may be enabled to connect to the payment network through Wi-Fi network 306. ASC 304 may be enbled to connect to the payment network through Wi-Fi network 308.

When ASC 302 is the initiator, ASC 302 may complete the transaction directly with ASC 304. For example, a cardholder of ASC 302 may have a monetary value of $100 that he desires to transfer to the cardholder of ASC 304. When ASC 302 and ASC 304 are in an NFC enabled range, ASC 302 and 304 may be enabled to initiate and complete the transfer. ASC 304 may input a PIN into the keypad on 304. The PIN may be received at the payment network 310 via a Wi-Fi network 306. The payment network 310 may verify the PIN and generate an OTP. The OTP may be transmitted from the payment network 310 to ASC 304. Through active NFC, ASC 302 may be enabled to retrieve the OTP, and transmit the OTP back to the payment network along with a transaction amount. Payment network 310 may confirm the OTP to be the same OTP generated for the ASC 304 and may deposit the $100 from ASC 302 into an account associated with ASC 304.

Figure 4:
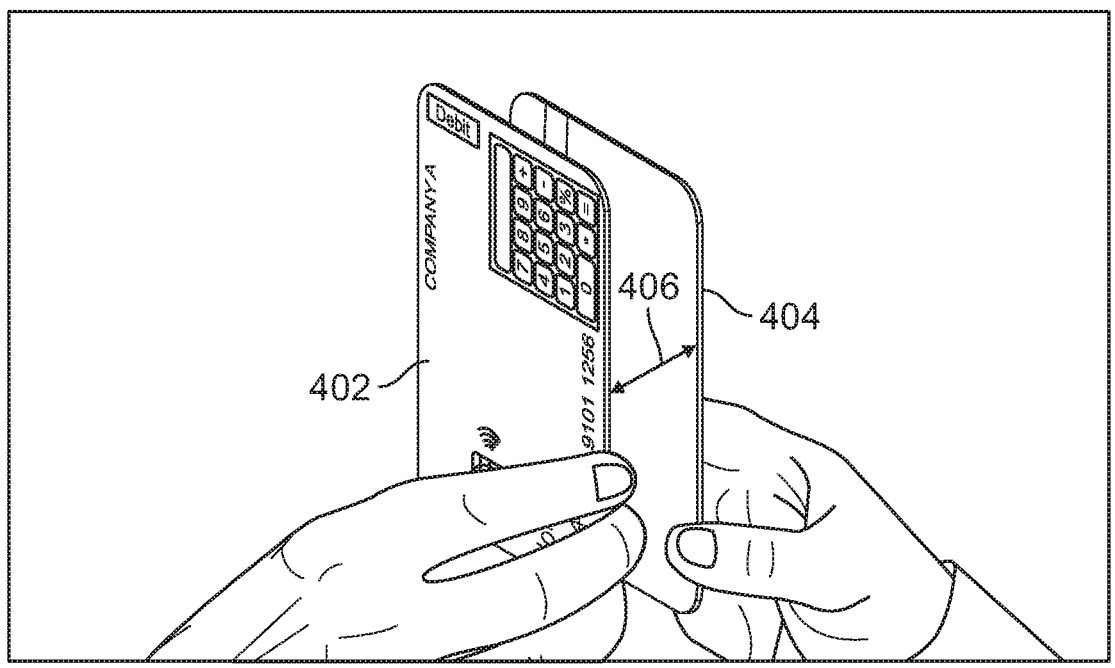
FIG. 4 shows an illustrative diagram in accordance with principles of the disclosure.

FIG. 4 shows an illustrative diagram 400 of a card-to-card direct communication. A cardholder of the first active ASC may position his card in a first position as shown at 402. The cardholder of the second active ASC may position his card in a second position, as shown at 404. The two positions may be within close proximity of each other. In order to perform a transaction and enable a two-way communication between the two cards, the distance between the two cards may be a distance ranging between zero and up to approximately 10 cm, as shown at 406. It should be appreciated that exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

Figure 5:
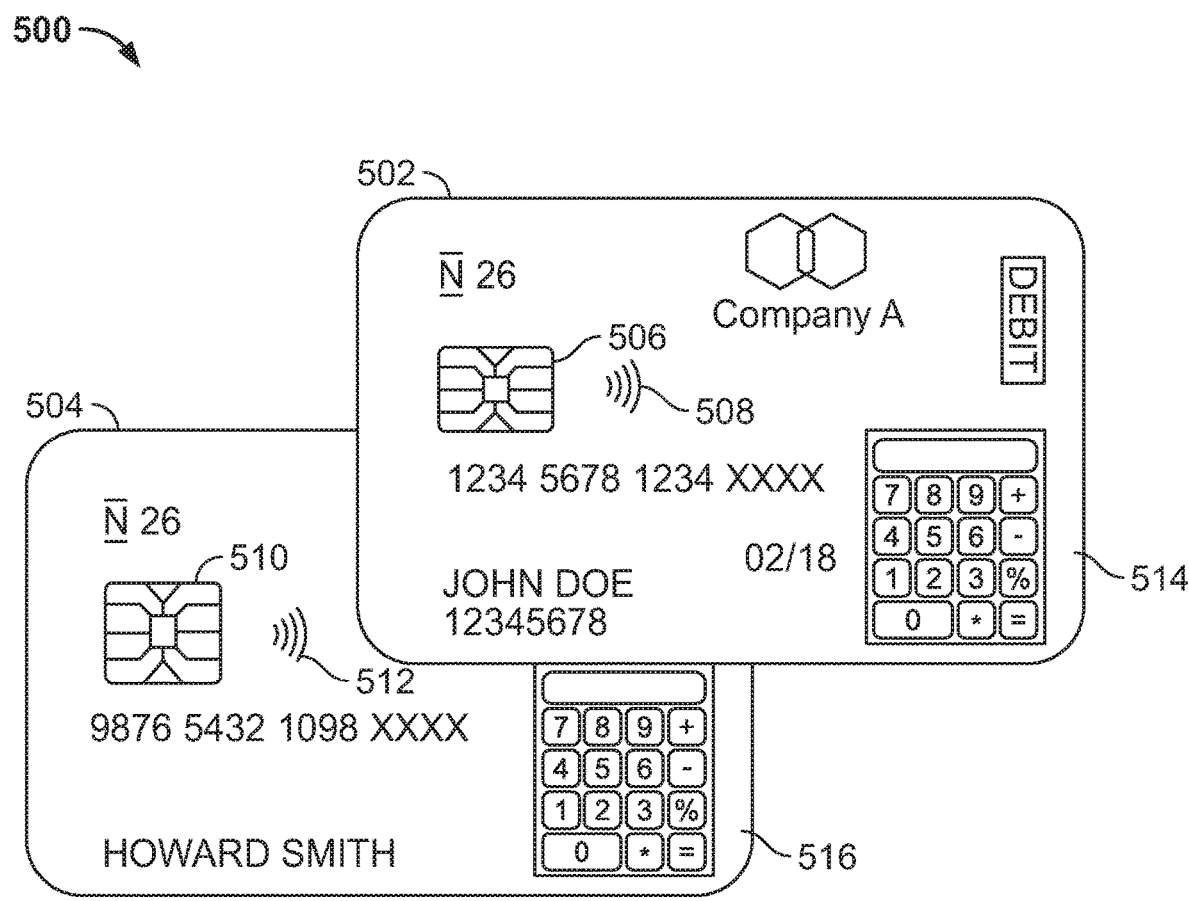
FIG. 5 shows an illustrative diagram in accordance with principles of the invention.

FIG. 5 shows an exemplary diagram 500 of two active smart cards in close proximity to each other. The two smart cards may be directly communicating with one another. The first active smart card 502 and the second active smart card 504 may be active NFC enabled devices. This direct communication may be independent of any intermediary device.

The first active smart card 502, in this exemplary diagram 500, may be a debit card, as shown at 512. Card 502 may include an EMV chip 506 and an NFC symbol 508. Debit card 502 may belong to a user 'John Doe.'

ASC 502 may be associated with Company A, as shown at 514. ASC 504 may be associated with Company B, as shown at 516. It should be appreciated that Company A and Company B may be different originating entities. However they may be associated with the same payment network.

The second active smart card 504, in this exemplary diagram 500, may also be a debit card. Debit card 504 may include an EMV chip 510 and an NFC symbol 512. Debit card 504 may belong to a user 'Howard Smith.'.

The NFC symbols 508 and 512 both signify that the debit card can be used in a contactless transaction. It should be appreciated that in this exemplary diagram 500, debit cards 502 and 504 are both active NFC enabled devices. These active NFC enabled devices may include active NFC readers that may enable the two debit cards to exchange information and complete a contactless transaction independent of any POS device.

FIG. 6 shows an exemplary flowchart of a secure transaction between a first and second active smart card.

At step 602, a wireless NFC communication may be initiated between the two ASC cards shown at 600. At step 604, a PIN may be received as input on the keypad of the second ASC. At step 606, the PIN may be verified by the payment network. Once the PIN is verified, the payment network may generate an OTP and transmit it to the second ASC. As shown at step 608, the generated OTP may be received on the second ASC from the payment network.

Using the active NFC reader on the first ASC, the first ASC may be configured to retrieve the generated OTP from the second ASC, as shown at 610. Additionally, the first ASC may be configured to receive input of a transaction amount, as shown at 612. At step 614, the OTP and the transaction amount may be transmitted to the payment network. At step 616 the payment network may verify the OTP. The verification may include verifying that the OTP transmitted is equal to the OTP generated for the second ASC.

In response to the verification, the transaction may be completed between the first and second ASC. The transaction may be completed via the payment network and the first ASC as shown at 618.

Thus, methods and apparatus for securing a transaction between two active smart cards using a generated OTP is provided. Persons skilled in the art will appreciate that the present invention can be practiced by other than the described embodiments, which are presented for purposes of illustration rather than of limitation, and that the present invention is limited only by the claims that follow.

What is claimed is:

1. A method for performing a card-to-card direct contactless transaction between a first active smart card ("ASC") and a second ASC, the first ASC being an initiator of a transaction, the second ASC being the target of the transaction, using a generated OTP to secure the transaction, each of the first ASC and second ASC comprising an active near-field communication ("NFC") reader, the first ASC and the second ASC associated with an originating entity, the method comprising:

activating each of the first ASC and the second ASC from an inactive state to an active state by:

for the first ASC:

receiving input of personal identification number ("PIN") on a keypad located on the first ASC;

verifying, using the microprocessor embedded in the first ASC, the PIN being associated with the first ASC; and activating the first ASC; and for the second ASC:

receiving input of the PIN on a keypad located on the second ASC;

verifying, using the microprocessor embedded in the second ASC, the PIN being associated with the second ASC; and activating the second ASC;

following the activating of each of the first ASC and the second ASC, performing a secure handshake between the first ASC and the second ASC by:

retrieving card ID data associated with the second ASC, using the active NFC reader associated with the first ASC;

acknowledging and confirming the card ID data using a microprocessor embedded in the first ASC;

using the active NFC reader associated with the second ASC, retrieving card ID data associated with the first ASC and the transaction amount, from the first ASC; and acknowledging and confirming the card ID data and the transaction amount associated with the first ASC using the microprocessor embedded in the second ASC;

initiating a wireless NFC communication to perform the transaction between the first ASC and the second ASC, wherein each of the first ASC and the second ASC comprise a keypad, and the first ASC and the second ASC, at its thickest point, are not thicker than 0.8 millimeters ("mm"), the initiating enabled using the NFC reader, the initiating comprising positioning the first ASC within a pre-determined distance to the second ASC;

following the initiating, retrieving, by the first ASC, data associated with the originating entity of the second ASC;

when the originating entity associated with the first ASC is determined not to be the originating entity, the method comprises terminating the wireless NFC communication; and when the originating entity associated with the first ASC is determined to be the originating entity, the method comprises:

securing the transaction by:

receiving, on a keypad located on the second ASC, input of the PIN;

verifying the PIN by a payment network associated with the originating entity, the PIN being transmitted to the payment network by a microprocessor of the second ASC; and in response to the verifying, further securing the transaction by:

receiving at the second ASC, from the payment network, a generated one-time password ("OTP");

retrieving, using the NFC reader associated with the first ASC, the generated OTP from the second ASC;

receiving input of a transaction amount on the keypad of the first ASC;

transmitting, using a microprocessor embedded in the first ASC, the generated OTP and the transaction amount to the payment network;

verifying and thereby yet further securing, by the payment network, that the generated OTP is equal to the OTP generated for the second ASC; and in response to the verifying, completing the transaction using the first active smart card and the payment network.

2. The method of claim 1 wherein the originating entity for the first ASC is the originating entity for the second ASC.

3. The method of claim 1 wherein the originating entity for the first ASC is a first originating entity and the originating entity of the second ASC is a second originating entity and the payment network is a consortium for the first and second originating entity.

4. The method of claim 1 wherein the positioning of the first ASC and the second ASC within the pre-determined proximity automatically activates each of the first ASC and the second ASC.

5. The method of claim 1 wherein the keypad embedded in each of the first and second ASC comprises alpha-numeric keys configured to be depressed and the keypad at its thickest point is thinner than 0.8 mm.

6. The method of claim 1 wherein the pre-determined distance of the positioning comprises positioning the first ASC equal to or less than a distance of four inches from the second ASC.

7. The method of claim 1 wherein each of the first ASC and the second ASC are equal to a size not smaller than 90% of 86 mm (width)×54 mm (height).

8. The method of claim 1 wherein when the generated OTP transmitted to the first ASC is not equal to the OTP generated for the second ASC, the method comprises terminating the wireless NFC communication between the first and second ASC.

9. The method of claim 1 wherein prior to the activating the first ASC and the second ASC, the active NFC reader is powered-off on each of the first ASC and the second ASC.

10. The method of claim 1 wherein following the completion of the transaction, the method further comprises:

receiving, using the active NFC reader on the second ASC, a confirmation from the first ASC of the completing of the transaction; and displaying, on a display of the second ASC, a message confirming the completion of the transaction, the displaying enabled by a transmittal of the confirmation from the microprocessor to the display via a display connector.

11. The method of claim 1 wherein the securing of the transaction further comprises monitoring and recording the transaction by the payment network.

12. An active smart card ("ASC") comprising:

an active near-field communication ("NFC") reader configured to enable an active wireless NFC communication with another NFC-enabled device;

a battery configured to power the active NFC reader;

an originating entity associated with the ASC;

a thickness wherein the ASC, at its thickest point, is not thicker than 0.8 millimeters ("mm");

a width and height of the ASC is not smaller than 90% of a width of 86 mm and not smaller than 90% of a height of 54 mm;

a keypad embedded on the ASC, the keypad comprising a display and alpha-numerical keys, wherein each alpha-numerical key is configured to be depressed and the keypad does not extend a thickness greater than 0.8 mm;

a microprocessor enabling processing, storing and transmitting card ID data, the microprocessor further enabled to communicate with a payment network associated with the originating entity;

a nano wireless network interface card ("NIC") card to enable establishing a wireless connection to a Wi-Fi device; and a display connector configured to intermediate between the keypad, the display and the microprocessor; and wherein, when the ASC is within a pre-determined distance of an additional ASC, the additional ASC comprising an active NFC reader, the ASC and the additional ASC are configured to activate the wireless NFC communication and complete a transaction.

13. The ASC of claim 12 wherein the additional ASC further comprises:

a battery configured to power the active NFC reader;

an originating entity associated with the additional ASC;

a thickness, wherein the ASC, at its thickest point, is not thicker than 0.8 millimeters ("mm");

a width and height of the ASC is not smaller than 90% of a width of 86 mm and not smaller than 90% of a height of 54 mm;

a keypad embedded on the ASC, the keypad comprising a display and alpha-numerical keys, wherein each alpha-numerical key is configured to be depressed;

a microprocessor enabling processing, storing and transmitting card ID data;

a nano wireless network interface card ("NIC") card to enable establishing a wireless connection to a Wi-Fi device; and a display connector configured to intermediate between the keypad, the display and the microprocessor.

14. The ASC of claim 13 wherein the activating further comprises:

the additional ASC being configured to:
  receive, on the keypad located on the additional ASC, input of a personal identification number ("PIN");
  verify the PIN by a payment network associated with the originating entity, the PIN being transmitted to the payment network by the microprocessor of the additional ASC;
  in response to the verifying, receive, from a payment network, a generated one-time password ("OTP");

the ASC being configured to:
  retrieve the generated OTP from the additional ASC using the NFC reader;
  receive input of a transaction amount on the keypad; and
  transmit, using the microprocessor, the generated OTP and the transaction amount to the payment network;

the payment network is configured to:
  verify that the generated OTP is equal to the OTP generated for the additional ASC; and
  in response to the verifying, communicate with the ASC to complete the transaction between the ASC and the additional ASC.

15. The ASC of claim 14 wherein in the event that the generated OTP retrieved by the ASC is not equal to the OTP generated for the additional ASC, the ASC is configured to terminate the wireless NFC communication between the ASC and the additional ASC.

16. An active smart card contactless payment system, the system enabling a contactless transaction between a first active smart card ("ASC") and a second ASC, the first ASC being an initiator of a transaction, the second ASC being the target of the transaction, the first ASC and the second ASC associated with an originating entity, the system using a generated OTP to secure the transaction, the system comprising:

the first ASC and the second ASC, each of the first and second ASC comprising:

an active near-field communication ("NFC") reader configured to enable an active wireless NFC communication with another NFC-enabled device;

a battery configured to power the active NFC reader;

an originating entity associated with the ASC;

a thickness of each of the first and second ASC, at its thickest point, is not thicker than 0.8 millimeters ("mm");

a width and height of the ASC is not smaller than 90% of a width of 86 mm and not smaller than 90% of a height of 54 mm;

a keypad embedded on the first and second ASC, the keypad comprising a display and alpha-numerical keys, wherein each alpha-numerical key is configured to be depressed and the keypad does not extend a thickness greater than 0.8 mm;

a microprocessor enabling processing, storing and transmitting card ID data, the microprocessor further enabled to communicate with a payment network associated with the originating entity; and a nano wireless network interface card ("NIC") card to enable establishing a wireless connection to a Wi-Fi device;

a display connector configured to intermediate between the keypad, the display and the microprocessor;

an originating entity associated with the first ASC;

an originating entity associated with the second ASC;

a payment network; and a WIFI device enabling the first ASC and the second ASC to connect to the payment network; and wherein:

when the first ASC is within a pre-determined proximity to the second ASC, the first ASC and the second ASC are configured to activate the wireless NFC communication;

receive, on the keypad located on the second ASC, input of a personal identification number ("PIN");

verify the PIN by the payment network associated with the originating entity, the PIN being transmitted to the payment network by the microprocessor of the second ASC; and in response to the verifying, secure the transaction by:
  receiving, from the payment network, a generated one-time password ("OTP");
  retrieving, using the NFC reader associated with the first ASC, the generated OTP from the second ASC;
  receiving input of a transaction amount on the keypad of the first ASC;
  transmitting, using the microprocessor embedded in the first ASC, the generated OTP and the transaction amount to the payment network; and
  verifying, by the payment network, that the generated OTP is equal to the OTP generated for the second ASC; and
  in response to the verifying, completing the transaction using the first ASC and the payment network.

17. The method of claim 16 wherein the originating entity for the first ASC is the originating entity for the second ASC.

* * * * *